US008256729B2

(12) United States Patent
Koch et al.

(10) Patent No.: US 8,256,729 B2
(45) Date of Patent: Sep. 4, 2012

(54) SUPPORT FOR THE HOLDING AND POSITIONING OF A UTILITY LOAD IN SPACE

(75) Inventors: Guido Koch, Karlsruhe (DE); Reinhard Pfeuffer, Elchesheim-Illingen (DE)

(73) Assignee: Maquet GmbH & Co. KG, Rastatt (DE)

(*) Notice: Subject to any disclaimer, the term of this patent is extended or adjusted under 35 U.S.C. 154(b) by 684 days.

(21) Appl. No.: 12/401,985

(22) Filed: Mar. 11, 2009

(65) Prior Publication Data

US 2009/0236484 A1 Sep. 24, 2009

(30) Foreign Application Priority Data

Mar. 20, 2008 (DE) .......................... 10 2008 015 210

(51) Int. Cl.
*E04G 3/00* (2006.01)
(52) U.S. Cl. ................ 248/292.11; 248/280.11; 248/325
(58) Field of Classification Search ............... 248/276.1, 248/278.1, 280.1, 281.11, 282.1, 323, 324, 248/325, 343, 280.11, 123.2, 177.1, 292.11; 396/419
See application file for complete search history.

(56) References Cited

U.S. PATENT DOCUMENTS 3,391,890 A * 7/1968 Perbal ....................... 248/280.11
(Continued)

FOREIGN PATENT DOCUMENTS

BE 385845 A 3/1932
(Continued)

OTHER PUBLICATIONS

International Search Report for serial No. EP09151511 dated Mar. 25, 2010.

*Primary Examiner* — Terrell McKinnon
*Assistant Examiner* — Eret McNichols
(74) *Attorney, Agent, or Firm* — McCormick, Paulding & Huber LLP (57) ABSTRACT

In a support for holding and positioning a utility load in space having a base (10) and an elongated supporting arm (12) which between its longitudinal ends is swingably supported on the base (10) for swinging moment about a vertical first axis (24) and about a horizontal second axis (30) which intersects the vertical first axis (24), the supporting arm (12) carrying on one side of the second axis the utility load and on the other side of the second axis carrying a counterweight compensating for the utility load, the utility load being arranged on a first connector arm (14) which is pivotally supported at one end of the supporting arm (12) for moment about a third axis (36), the counterweight (18) being arranged on a second connector arm which is swingably supported on the other end of the supporting arm (12) for movement about a fourth axis (38), the third and fourth axis being parallel to one another, the spacing (Ln) between the engagement point (N) of the utility load and the first connector arm (14) and the third axis (38) being equal to the spacing between the third axis (38) and the vertical axis (24), the spacing (Lg) measured in the longitudinal direction of the second connector arm (16) between the center of gravity (G) of the counterweight (18) and the fourth axis (38) being equal to the spacing between a fourth axis (38) and the vertical first axis (24), and the two connector arms (14, 16) being so coupled with one another by a coupling means that in any pivoted position they are directed antiparallel to one another.

9 Claims, 5 Drawing Sheets

U.S. PATENT DOCUMENTS

| | | | |
|---|---|---|---|
| 3,396,931 A * | 8/1968 | Eckstein | 248/280.11 |
| 4,163,538 A * | 8/1979 | Galione | 248/278.1 |
| 5,192,963 A * | 3/1993 | Hill | 396/428 |
| 5,405,117 A | 4/1995 | Davis | |
| 5,531,412 A * | 7/1996 | Ho | 248/123.2 |
| 6,045,104 A * | 4/2000 | Nakamura et al. | 248/280.11 |
| 6,378,829 B1 * | 4/2002 | Strater et al. | 248/276.1 |
| 6,398,172 B1 * | 6/2002 | Rousek et al. | 248/121 |
| 6,705,773 B2 * | 3/2004 | Fix | 396/419 |
| 7,416,163 B2 * | 8/2008 | Gaida et al. | 248/325 |
| 7,461,824 B2 * | 12/2008 | Poxleitner et al. | 248/278.1 |

FOREIGN PATENT DOCUMENTS

| | | |
|---|---|---|
| BE | 449251 A | 1/1948 |
| DE | 3312137 A1 | 10/1984 |
| DE | 4403415 A1 | 11/1994 |
| FR | 2505978 A1 | 11/1982 |
| GB | 698984 A | 10/1953 |
| GB | 2258445 A | 10/1993 |

* cited by examiner

SUPPORT FOR THE HOLDING AND POSITIONING OF A UTILITY LOAD IN SPACE

CROSS REFERENCE TO RELATED APPLICATION

Applicant hereby claims foreign priority benefits under U.S.C. §119 from German Patent Application No. 10 2008 015 210.2 filed on Mar. 20, 2008, the contents of which are incorporated by reference herein.

TECHNICAL FIELD

The invention concerns a support for the holding and positioning of a utility load in space with a base and an elongated supporting arm, which supporting arm is supported between its longitudinal ends on the base for rotational movement about a vertical first axis and for a swinging movement about a horizontal second axis, which horizontal second axis intersects the vertical first axis, with the supporting arm on one side of the second axis carrying the utility load and on the other side of the second axis carrying a counterweight compensating for the utility load.

BACKGROUND OF THE INVENTION

A support of the previously mentioned kind, which is known from the state of the art, has the advantage by way of the counterweight the utility load can be exactly compensated so that it is possible to force free move and to position the utility load in space. A disadvantage, however, is that with this system the utility load can only be positioned on a spherical surface. This for many applications is a relatively strong spatial limitation.

Further known are ceiling mounted support systems for the positioning of a utility load, such as for example an apparatus, a lamp or the like, comprising a ceiling connector, a supporting arm and a swing arm, at the free end of which the utility load hangs. The ceiling connector is rigidly fixed to the room ceiling by screws to absorb the forces and moments resulting from the utility load. These moments may be considerable depending on the utility load and the maximum effective radius, and are determinative for the choice of the degree of rigidity. The supporting arm is connected to the ceiling connector by a joint for swinging movement about the vertical axis. The remote end of the supporting arm carries a second joint rotatable about the vertical axis, to which for example the spring arm is connected. The spring arm includes a connector arm which from a horizontal position can be swung upwardly and downwardly about a first horizontal axis. At the end of the connector arm the connector arm is connected to the utility load, for example by way of a joint lying parallel to the connector arm. The vertical component of the swinging movement of the connector arm creates a height adjustment of the utility load with a spring delivering a counter force to the weight force, so that in each height position a stable weight compensated position is achieved. The horizontal portion of the connecting arm can execute a circular movement about the second rotation joint. In combination with the rotating movement about the first vertical rotation joint it is possible to reach each point of a horizontally lying circular surface, so that in cooperation with the up and down movement the utility load can be positioned at any point inside of a cylindrical space (more exactly: a barrel-shaped) space. Since in the realized construction no complete compensation of the weight force by way of a spring is achieved, the support system must be provided with friction in order to assure stability in the chosen position. This friction must be overcome by the user with each adjustment procedure.

BRIEF SUMMARY OF THE INVENTION

The invention has as its object the provision of a support of the previously mentioned kind which on one hand permits an at least nearly force free adjustment of the utility load without the introduction of moments to the base, and which on the other hand offers a wide adjustment range for a free positioning of the utility load in space.

This object is solved in accordance with the invention in that the utility load is arranged on the free end of a first connector arm, which first connector arm is connected to one end of the supporting arm for swinging movement about a third axis, in that the counterweight is arranged on a second connector arm which is supported on the other end of the supporting arm for swinging movement about a fourth axis, with the third and the fourth axes being parallel to one another, in that the spacing between the engagement point of the utility load on the first connector arm and the third axis is the same as the spacing between the first connector arm and the vertical axis, in that in the longitudinal direction of the second connector arm the measured distance between the center of gravity of the counterweight and the fourth axis is the same as the distance between the counterweight and the vertical first axis, and in that the two connector arms are so coupled with one another by a coupling that they in each position of their swinging movement are directed antiparallel to one another.

The solution according to the invention combines the merits of the above-described known solutions with one another. Based on the chosen lengths of the connector arms and the described coupling of the connector arm, an imaginary connecting line between the engagement point of the utility load on the first connector arm and the center of gravity of the counterweight on the second connector arm always runs through the vertical first axis independently of the momentary pivoted positions of the connector arms. Therefore the utility load remains exactly compensated independently of the pivoted position of the connector arms. With this arrangement, in the case of a horizontal supporting arm, each point on a circular surface with a radius of double the length of the first connector arm from the utility load can be reached. At the same time by a swinging of the supporting arm the utility load can be adjusted as to its height so that therefore the utility load can be adjusted as desired through a cylindrically shaped (or more exactly: barrel-shaped) space. With the arrangement according to the invention it is therefore possible to achieve a utility load positioning in space with complete mass compensation through the counterweight, with the load introduction into the base being free of moments. It furthermore has the benefit that the support structure can be easily realized.

The above-mentioned coupling of the two connector arms can be realized in different ways. For example the coupling can include a parallel arm directed parallel to the longitudinal direction of the supporting arm, which parallel arm at its ends is connected with the two connector arms with the formation of a joint rectangle. Another possibility exists in that the coupling includes an endless tension member guided over discs non-rotatably fixed to the two connector arms. In this case advantageously the tension member is a toothed belt or a chain, which runs over corresponding toothed discs or chain wheels.

The counterweight is advantageously arranged releasably on the second connector arm so that with the attachment of different utility loads to the first connector arm it can be exchanged for an appropriate substitute counterweight. Alternatively or additionally to this, the counterweight on the second connector arm can itself be adjusted in the longitudinal direction of the second connector arm in order to make possible a fine adjustment of the counterweighing effect.

In a preferred embodiment of the invention the support is made as a ceiling mounted support, with the base including a pedestal part for fixing to the ceiling and also including a bearing part receiving the supporting arm and arranged on the pedestal part for moment relative to the pedestal part about the vertical first axis.

If the utility load happens to be a device which independently of the pivoted position of the supporting arm and/or of the first connector arm is to retain its orientation relative to the vertical, special measures are required to assure the maintenance of that orientation. If the first connector arm is arranged perpendicular to the supporting arm, then in the case of a swinging of the supporting arm only the angle of this swinging must be compensated. As to this it is advantageous if the utility load is arranged on a carrier head which is swingable about a pivot axis which is parallel to the longitudinal direction of the first connector arm. To assure an automatic adjustment of the carrier head suiting a swinging of the supporting arm, it is proposed in accordance with the invention that the carrier head is non-rotatably connected with a shaft coaxial with the swinging axis, which shaft is hingedly connected with a first leg of a first four joint coupling arranged inside of the supporting arm, the four joint coupling having a second leg parallel to the first leg directed vertically and rigidly connected with the bearing part which receives the supporting arm, with a joint axis running through the second leg coinciding with the horizontal second axis and with the first and the second legs being connected by a first parallel arm directed parallel to the longitudinal direction of the supporting arm. By way of this first four joint coupling it is assured that the utility load on the first connector arm, for example independently of the pivoted position of the carrier arm, always maintains a given vertical position. This above all is true only for the case where the first connector arm with its longitudinal direction is directed perpendicularly to the longitudinal direction of the supporting arm. If the angle between the first connector arm and the supporting arm is other than 90° the possibility must also exist that the utility load can be swung about a horizontal axis, in order for example to maintain the given vertical utility load orientation. In regard to this it is proposed in accordance with the invention that the carrier head include a head part connected with the first connector arm and a holding part connectable with the utility load, that on the head part a first connector arm is movable about a hinge axis perpendicular to the longitudinal axis perpendicular to the longitudinal direction on the first connector arm and in that the holding part is connected with the first leg of the first four joint coupling by way of a second parallel arm parallel to the longitudinal direction of the first connector arm with the formation of a second four joint coupling, whose joint axes are parallel to the joint axes of the holding part. With this the given orientation of the utility load can be automatically maintained independently of the pivoted position of the carrier arm and of the momentary pivoted position of the first connector arm relative to the supporting arm.

The base, the supporting arm, as well as the first and second connector arms, of the support according to the invention can be designed for the receiving and guiding of power lines for the chosen utility load.

BRIEF DESCRIPTION OF THE DRAWINGS

Further advantages and features of the invention will be apparent from the following description which in connection with the accompanying drawings explain the invention by way of exemplary embodiments. The drawings are.

DETAILED DESCRIPTION OF THE INVENTION

Figure 1:
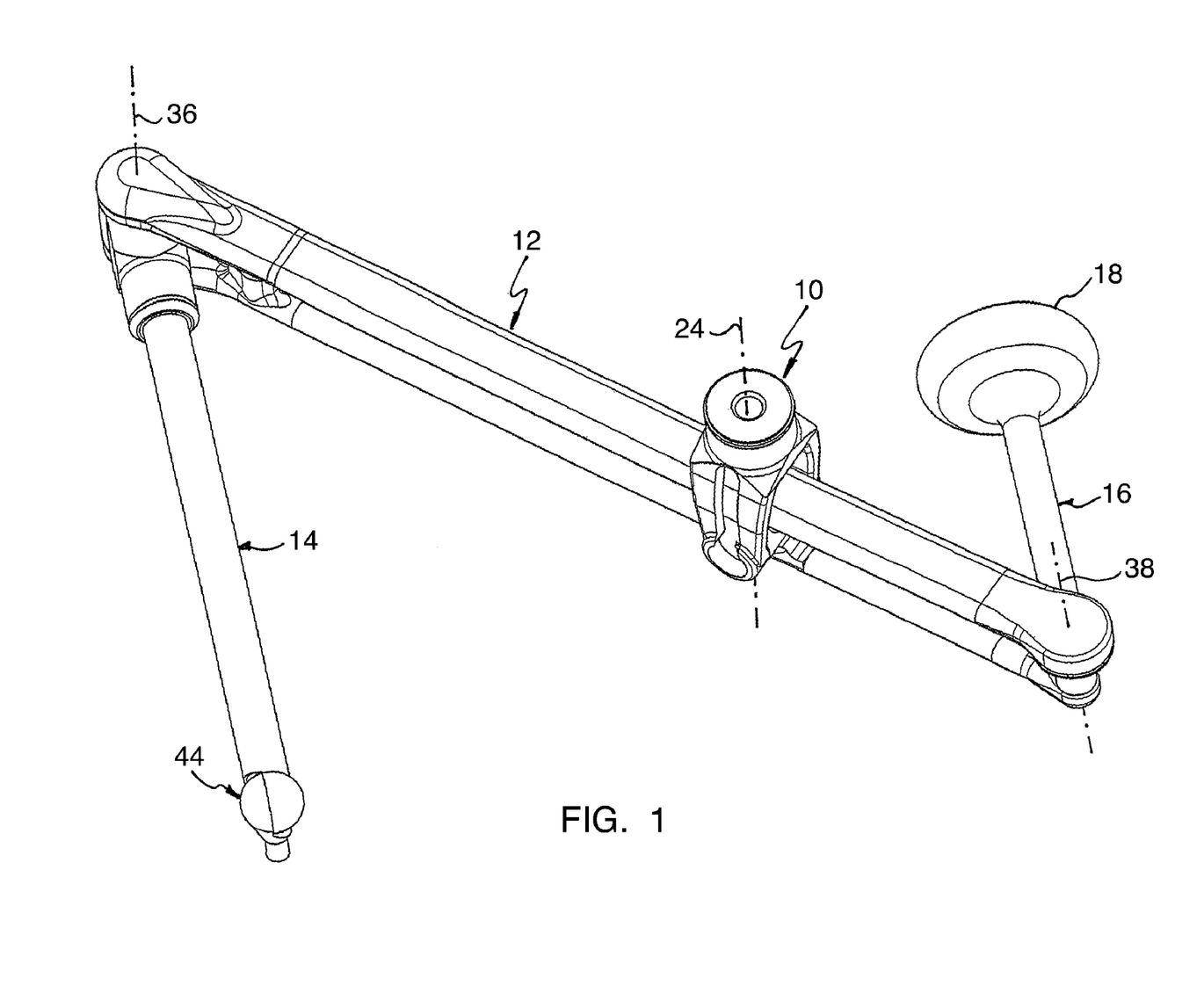
FIG. 1 is a partially schematic perspective illustration of a ceiling mounted support according to the invention.

The ceiling mounted support partially schematically illustrated in FIG. 1 includes a base 10 and an elongated supporting arm 12, to the two ends of which supporting arm are hingedly connected a first connector arm 14 for holding a non-illustrated utility load and a second connector arm 16 which carries a counterweight 18. The counterweight can in a non-illustrated way be adjustable in the longitudinal direction of the second connector arm 16.

The base includes a pedestal part 20 (FIG. 5) fixable to a space ceiling, on which pedestal part a fork-shaped bearing part 22 is rotatably supported for movement about a first vertical axis 24. Between the fork legs 26 of the bearing part 24 the supporting arm 12 is swingably supported (FIG. 5) on a shaft journal 28 for swinging movement about a horizontal axis 30.

The supporting arm 12 comprises an upper strut 32 and a lower strut 34 between which the first connector arm 14 is swingable about a third axis 36 and the second connector arm 16 is swingable about a fourth axis 38. The axes 36 and 38 lie in a plane with the first axis 24.

Figure 2:
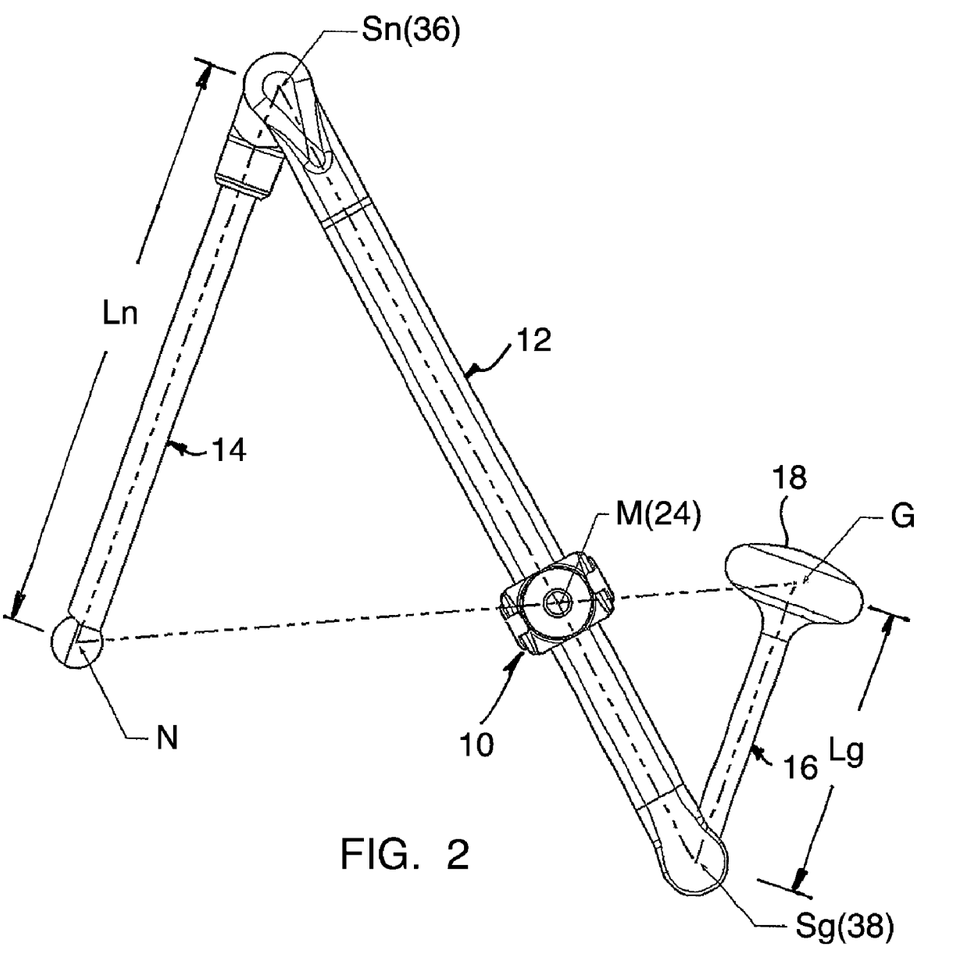
FIGS. 2 and 3 are each plan views of the ceiling mounted support according to FIG. 1 in respectively different pivoted positions of the two connector arms.
Figure 3:
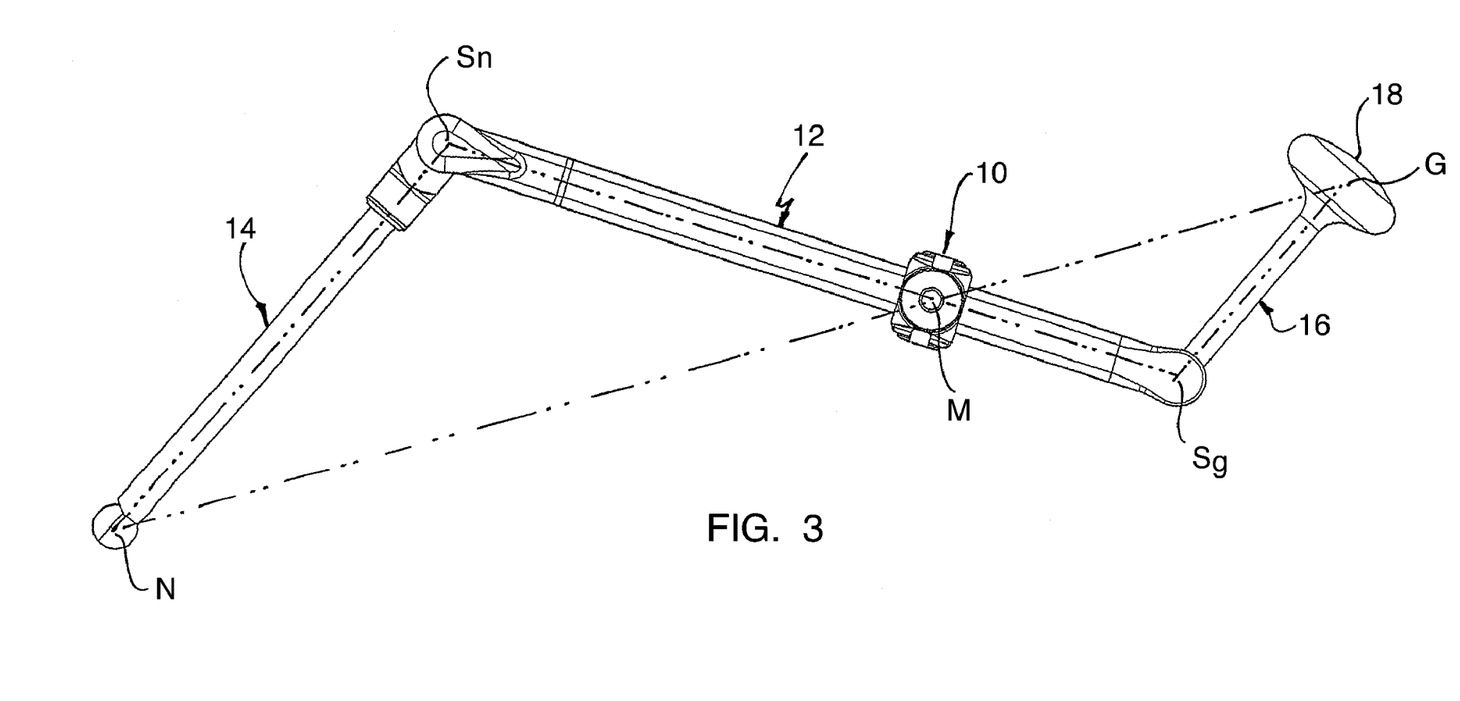
Figures 6, 7:
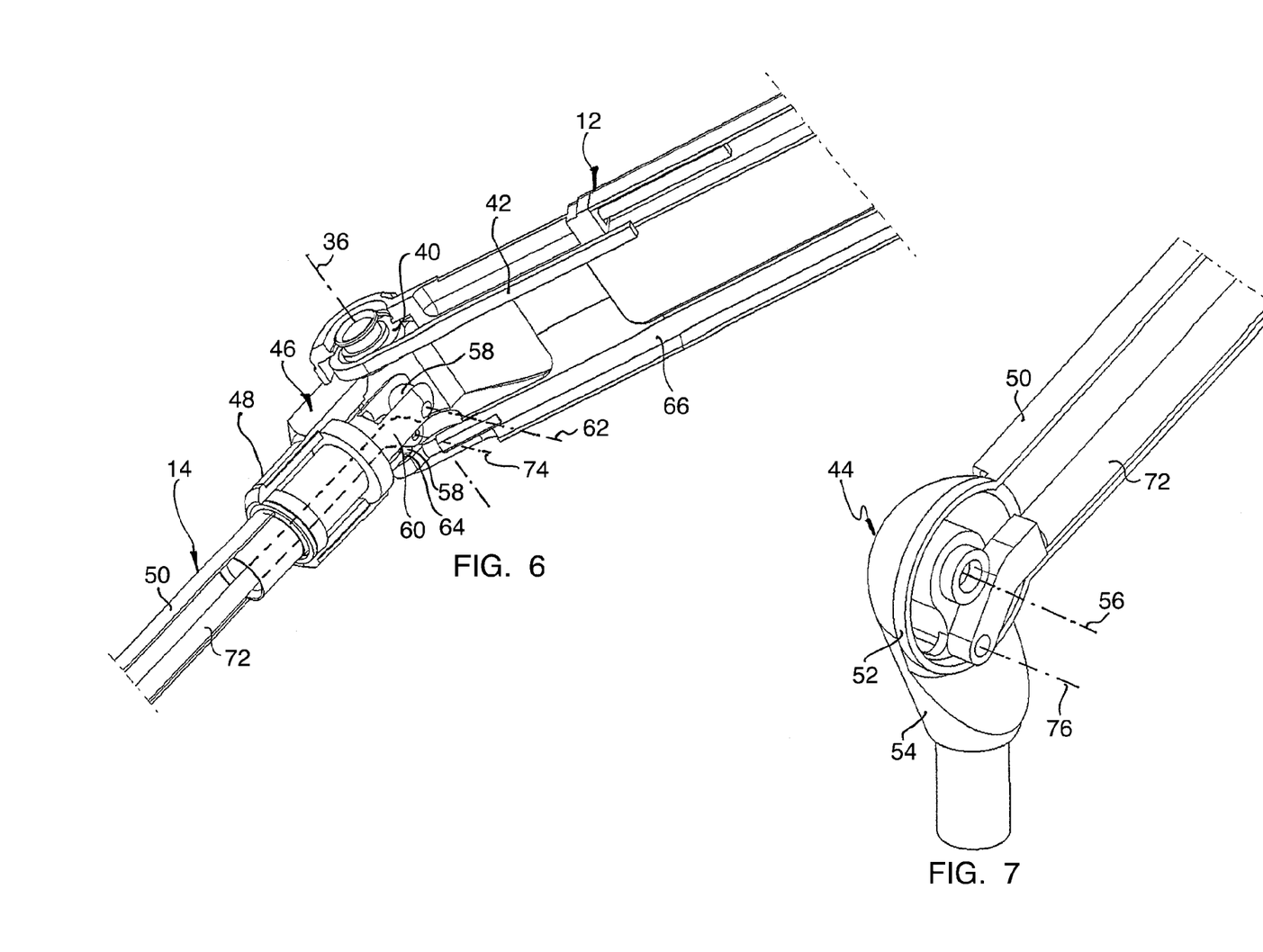
FIG. 6 is an enlarged detailed illustration of the region of the joint between the supporting arm and the utility load carrying connector arm.
FIG. 7 is an enlarged detailed illustration of the carrier head by way of which the utility load is hung onto the first connector arm.

The first connector arm and a second connector arm are in those joints by which they are connected with the supporting arm 12 each non-rotatably fixed to a toothed disc 40 such as shown in FIG. 6 only for the joint between the first connector arm 14 and the supporting arm 12. Over these toothed discs runs a toothed belt 42 which thereby couples together the two toothed discs 40 of the first connector arm 14 and the second connector arm 16 so that the two connector arms 14 and 16 always maintain their antiparallel orientation as illustrated in FIGS. 1 to 3, independently of their pivot angle relative to the supporting arm 12. This can be clearly recognized from a comparison of FIGS. 1 and 3.

In FIG. 2 the position of the first axis 24 is designated as M. The positions of the third axis 26 and of the fourth axis 38 are designated by Sn and Sg. The engagement point of the utility load with the carrier head 44 connected to the first connector arm 14 is indicated at N. The center of gravity of the counterweight or compensating weight 18 is indicated at G. The measurements are so chosen that the distance, indicated at Ln between the points Sn and N is equal to the distance between the points Sn and M, and so that in similar way the distance, indicated at Lg, between the points Sg and G is equal to the spacing between Sg and M. The weight of the counterweight 18 is chosen to have the same relationship to that of the utility load as the relation of Ln to Lg.

Because of the coupling between the two connector arms 14 and 16 one can think of triangles set up by the points M, Sn, N as well as by the points M, Sg, G, which triangles are recognizable by the broken lines of FIG. 2 and both of which triangles have equal legs and are geometrically similar to one another. The connecting line N-G goes, because of the equal legedness of the triangles through the point M. The relationship of the spacing N-M to the spacing G-M is, because of the geometric symmetry, equal to the relationship of Ln to Lg. Since this is true for any angle between the first connector arm 14 and the supporting arm 12, the utility load is compensated in each position of the connector arms 14, 16 relative to the rotation axis 24 (point M). By decreasing or increasing the angle between the connector arms 14, 16 and the supporting arm 12 the utility load can reach every point inside of a circular surface with a radius 2 Ln. A swinging of the supporting arm 12 about the first axis 24 defines the horizontal circular surface, a swinging of the supporting arm about the second axis 30 permits a variation of the height of the utility load, with the weight compensating relationship between the utility load and the counterweight 18 being undisturbed by the movement of the utility load. Therefore, it is possible to achieve a utility load positioning in space with a complete mass compensation by the counterweight. The load introduction into the ceiling structure by way of the base 10 therefore remains moment free.

The utility load can be in the form of an arbitrary device, for example, a medical operating room light or a monitoring arrangement. While the operating light usually includes a hinged arm on which the lamp body is cardanically supported for a movement about 3 interchangeable axes positioned perpendicularly to one another, and can therefore be brought into any position, in the case of a monitoring arrangement one as a rule wants to make certain that the monitor maintains its given orientation in space independently of the swung angle of the supporting arm or of the monitor carrying first connector arm 14. This maintenance of the given orientation of the utility load in space independently of the pivoted position of the carrying arm 12 or of the first connector arm is assured through the use of two four joint couplings which are explained in the following.

Figures 4, 5:
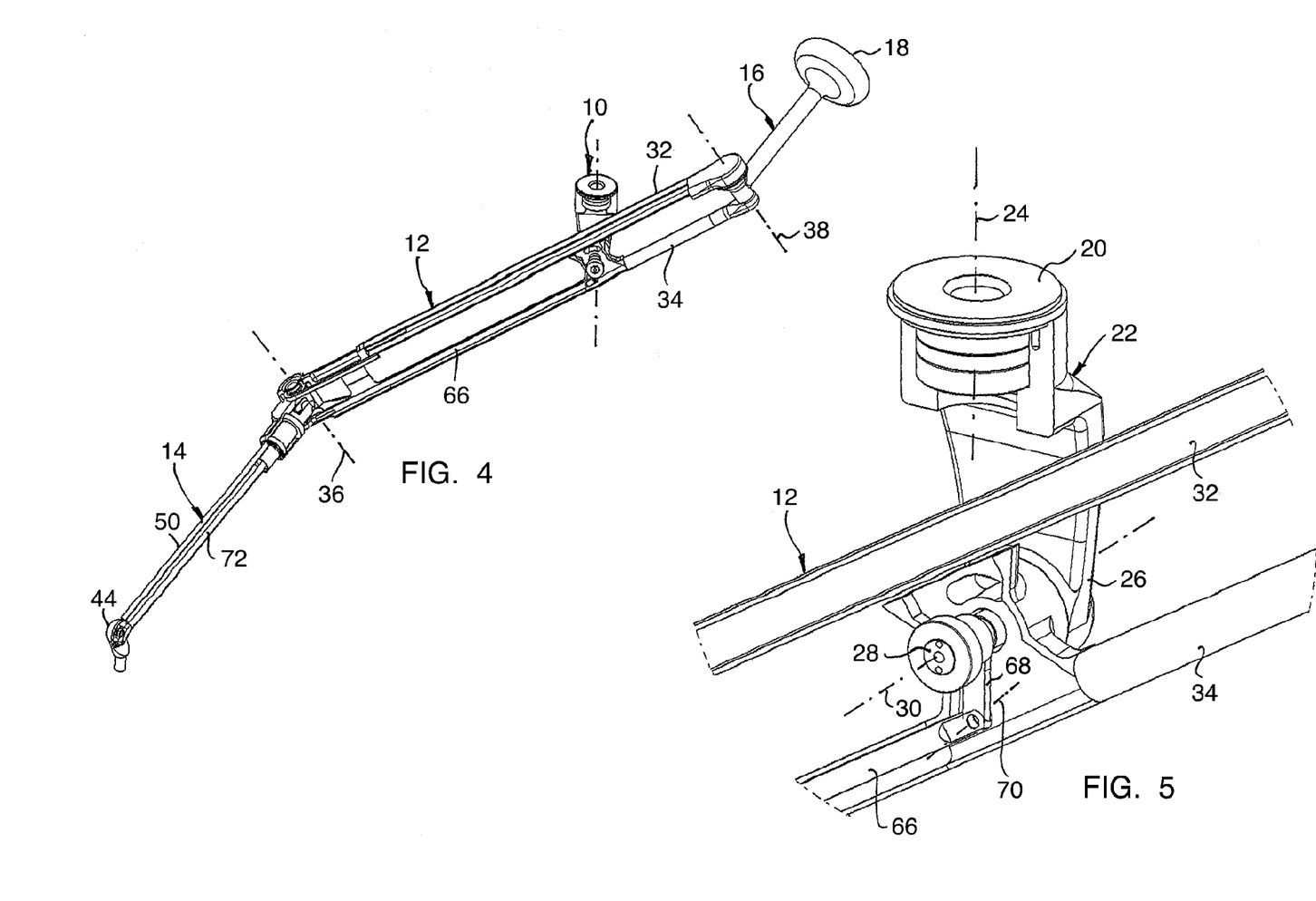
FIG. 4 is a partially broken away perspective side view of the support of FIG. 1.
FIG. 5 is an enlarged illustration of a detail of FIG. 4 which shows the supporting of the supporting arm on the base.

Here reference is first made to FIGS. 4 and 6. The first support arm 14 is comprised essentially of a joint part 46 with a cuff 48 swingably supported in the supporting arm 12, and a pipe 50 which is rotatably supported in the collar 48 and which at its free end carries the carrier head 44. The carrier head 44 in turn includes a head part 52 rigidly fixed to the pipe 50, on which head part 52 a holding arm 54 is swingably supported for moment about a swinging axis 56. The utility load is then fastened to the holding arm 54. If the supporting arm 12 is swung about the horizontal second axis 30 the carrier head 44 together with the connector arm 14 is rotated about the longitudinal axis of the connector arm 14. That means that the holding arm 54 and with it the utility load is swung in a vertical plane, insofar as the first connector arm 14 forms an angle of 90° with the supporting arm 12. If the angle between the first connector arm 14 and the supporting arm 12 is other than 90°, the holding arm 54 and with it the utility load carries out a tilting movement about two space axes when the supporting arm 12 is swung about the horizontal second axis 30.

To compensate for the rotary movement of the first connector arm 14 about its longitudinal axis use is made of a first four joint coupling having a first leg 58 which is connected with a fork 60 rigidly fixed to the pipe 50 of the first connector arm 14 for movement about an axis 62. The other end of the leg 58 is hingedly connected by way of a universal joint with a parallel arm 66 guided in the lower spar 34 of the supporting arm 14 for longitudinal sliding moment. This connects the first leg 58 with a second leg 68 of the four joint coupling which by way of shaft pin 28 is connected non-rotatably with the bearing part 22 and with the parallel arm 66 for a swinging moment about a joint axis 70. The four joint coupling therefore comprises the arm axes 30, 70, the universal joint 64 and the rotational axis of the control arm pipe 50 in the collar 48. If the supporting arm 12 is swung relative to the bearing part 22 by way of this four joint coupling 68, 66, 58 and the fork 60 the connector arm pipe 50 is swung relative to the supporting arm 12 about its longitudinal axis so that the holding arm 54 maintains its orientation in space, insofar as the first connector arm 14 forms an angle of 90° with the supporting arm 12 and is thereby directed horizontally.

On the other hand if the angle is other than 90° and upon tipping of the supporting arm 12 the first connector arm 14 does not lie in a horizontal plane, a further compensation movement must take place through a second four joint coupling. This coupling comprises again the first leg 58 to which is connected for swinging moment about a swing axis 74 a parallel arm 72 running inside of the arm pipe 50, which parallel arm 72 with its other end is hingedly connected with the support arm 52 for movement about an axis 76, as is shown in FIG. 7. The second four joint coupling therefore includes the joint axes 62, 74, 56 and 76. The full compensating movement for maintaining a given orientation of the utility load in space upon a given pivoting moment of the supporting arm 12 and of the first connector arm 14 includes therefore a rotation of the connector arm pipe 50 by means of the first four joint coupling by way of a longitudinal shifting of the parallel arm 72 of the second four joint coupling.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A support for the holding and positioning of a utility load in space the support comprising:
   a base;
   an elongated supporting arm, which supporting arm between its longitudinal ends is swingably supported on the base for movement about a vertical first axis and about a horizontal second axis, which horizontal second axis intersects the vertical first axis;
   a first connector arm which is supported on one end of the supporting arm for swinging movement about a third axis; and
   a second connector arm which is located at the other end of the supporting arm for swinging moment about a fourth axis, with the third and the fourth axes being parallel to one another
   wherein the first connector arm includes a carrier head at the end opposite the third axis for carrying the utility load at an engagement point (N);
   wherein the second connector arm carries a counterweight at the end opposite the fourth axis, the counterweight having a center of gravity (G);
   wherein a spacing (Ln) between the engagement point (N) and the third axis is equal to the spacing between the third axis and the vertical first axis;
   wherein in a longitudinal direction of the second connector arm a measured spacing (Lg) between the center of gravity (G) of the counterweight and the fourth axis is equal to the spacing between the fourth axis and the vertical first axis;

wherein the two connector arms are so coupled with one another through a coupling means that they in any pivoted position are directed antiparallel to one another;

wherein the carrier head is swingable about a longitudinal axis of the first connector arm;

wherein the carrier head includes a head part that is nonrotatably connected with a shaft of the first connector arm, the shaft being coaxial to the longitudinal axis of the first connector arm, which shaft is hingedly connected with a first leg of a first four-joint-coupling arranged inside of the supporting arm, a second leg of which first four-joint-coupling is parallel to the first leg and directed vertically and is rigidly connected with a supporting arm receiving bearing part of the base, with a joint axis running through the second leg being parallel to the horizontal second axis and with the first and second legs being connected with one another by a first parallel arm directed parallel to the longitudinal direction of the supporting arm;

wherein the first leg of the first four-joint-coupling is connected with the first parallel arm by way of a universal joint; and wherein the carrier head includes a holding part supported by the head part and connectable with the utility load and including a joint axis perpendicular to the longitudinal direction of the first connector arm, in that the holding part is swingable about the joint axis, and in that the holding part is connected with the first four-joint-coupling by way of a second parallel arm parallel to the longitudinal direction of the first connector arm with the formation of a second four-joint-coupling including the holding part of the carrier head, the second parallel arm, the first leg of the first four-joint-coupling and the shaft of the first connector arm whose joint axes include the joint axis of the holding part, a first swing axis coupling the holding part to the second parallel arm, a second swing axis coupling the second parallel arm to the first leg and a third swing axis coupling the first leg to the shaft of the first connector arm, the joint axes being parallel to one another.

2. The support according to claim 1, wherein the first, third and fourth axis lie in a common vertical plane.

3. The support according to claim 1, wherein the coupling means includes an endless tension member which is guided over discs respectively nonrotatably connected to the two connector arms.

4. The support according to claim 1, wherein the counterweight is releasably connected to the second support arm.

5. The support according to claim 1, wherein the counterweight is adjustable on the second connector arm in the longitudinal direction of the second connector arm.

6. The support according to claim 1, wherein the support is made as a ceiling mounted support with the base including a pedestal part to be fastened to the ceiling and also including a bearing part receiving the supporting arm and supported on the pedestal part for rotation about the vertical first axis.

7. The support according to claim 1, wherein the utility load is a monitoring arrangement.

8. The support according to claim 1, wherein the utility load is a lamp.

9. The support according to claim 1, wherein the base, the supporting arm as well as the first and the second connector arms are formed for the receiving and guiding of power conductors for the utility load.

* * * * *